United States Patent
Claar et al.

(10) Patent No.: US 7,380,632 B2
(45) Date of Patent: Jun. 3, 2008

(54) SAFETY SYSTEM FOR OPERATING AT LEAST ONE ELECTRICALLY ACTUATED LOCKING APPARATUS OF A DOOR OF A MOTOR VEHICLE

(75) Inventors: Klaus-Peter Claar, Gechingen (DE); Martin Lindmayer, Sulz (DE)

(73) Assignee: DaimlerChrysler AG, Stuttgart (DE)

( * ) Notice: Subject to any disclaimer, the term of this patent is extended or adjusted under 35 U.S.C. 154(b) by 495 days.

(21) Appl. No.: 11/128,359

(22) Filed: May 13, 2005

(65) Prior Publication Data

US 2005/0274561 A1 Dec. 15, 2005

(30) Foreign Application Priority Data

May 15, 2004 (DE) .............. 10 2004 024 265

(51) Int. Cl.
*B60R 21/01* (2006.01)
(52) U.S. Cl. .............. 180/274; 180/271; 180/286
(58) Field of Classification Search .............. 180/271, 180/274, 281, 282, 286; 49/31; 296/68.1; 701/45; 307/10.1
See application file for complete search history.

(56) References Cited

U.S. PATENT DOCUMENTS

| | | | | |
|---|---|---|---|---|
| 4,217,582 A * | 8/1980 | Endo et al. ................ 342/70 |
| 4,458,446 A * | 7/1984 | Mochida et al. ............ 49/28 |
| 4,667,195 A * | 5/1987 | Kodera et al. ............ 340/901 |
| 5,327,990 A * | 7/1994 | Busquets .................. 180/271 |
| 6,170,864 B1 * | 1/2001 | Fujita et al. ............. 280/735 |
| 6,895,312 B2 * | 5/2005 | Iida ......................... 701/1 |
| 6,998,969 B2 * | 2/2006 | Aiyama et al. ........ 340/426.28 |
| 7,102,539 B2 * | 9/2006 | Kawazoe et al. .......... 340/940 |
| 7,109,850 B2 * | 9/2006 | Kawazoe et al. ........ 340/425.5 |
| 2001/0007963 A1 * | 7/2001 | Ugusa et al. .............. 701/49 |
| 2004/0059488 A1 * | 3/2004 | Iida ......................... 701/49 |
| 2004/0124027 A1 * | 7/2004 | Aiyama et al. ............ 180/274 |
| 2005/0274561 A1 * | 12/2005 | Claar et al. ............... 180/281 |
| 2006/0033612 A1 * | 2/2006 | Santa ...................... 340/435 |
| 2007/0085669 A1 * | 4/2007 | Becker et al. .......... 340/457.1 |

FOREIGN PATENT DOCUMENTS

| | | |
|---|---|---|
| DE | 27 51 821 | 10/1978 |
| DE | 31 16 867 A1 | 11/1982 |
| DE | 35 07 381 A1 | 9/1986 |
| DE | 44 11 184 C2 | 6/1998 |

(Continued)

*Primary Examiner*—Anne Marie M. Boehler
*Assistant Examiner*—Barry Gooden, Jr.
(74) *Attorney, Agent, or Firm*—Crowell & Moring LLP

(57) ABSTRACT

A safety system for operating at least one electrically actuated locking apparatus of a door of a motor vehicle has a crash sensor for sensing an imminent accident event. Upon sensing an accident event with a crash sensor within a first specified interval of time, the locking apparatus remains bolted within a second specified interval of time, which has such a length that it includes the entire temporal course of the accident event, and is subsequently unbolted. The crash sensor for sensing an imminent accident event, upon recognizing a possible imminent accident event, actuates central bolting in such a way that the locking apparatus of the door is bolted for the first specified interval of time. This first specified time interval has such a length that the possible accident event will fall in the time interval specified.

11 Claims, 1 Drawing Sheet

FOREIGN PATENT DOCUMENTS

| | | |
|---|---|---|
| DE | 198 06 049 A1 | 8/1999 |
| DE | 198 22 184 A1 | 11/1999 |
| DE | 198 22 548 A1 | 11/1999 |
| DE | 198 33 751 A1 | 1/2000 |
| DE | 197 50 979 C2 | 9/2000 |
| DE | 100 39 693 A1 | 3/2002 |
| DE | 101 21 386 C1 | 8/2002 |
| DE | 101 48 340 A1 | 4/2003 |
| DE | 102 19 536 A1 | 11/2003 |
| EP | 1 375 267 A2 | 1/2004 |

* cited by examiner

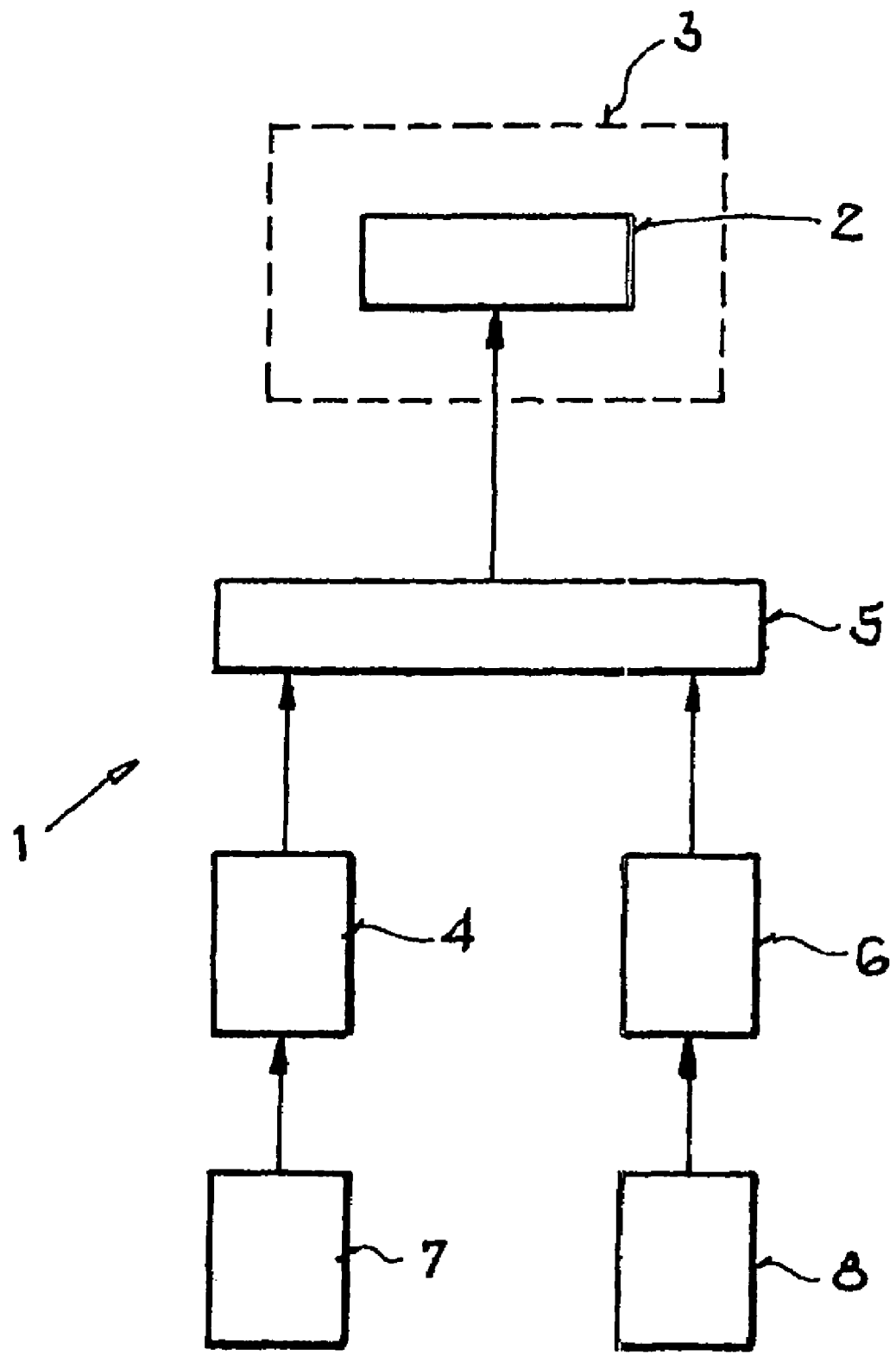

SAFETY SYSTEM FOR OPERATING AT LEAST ONE ELECTRICALLY ACTUATED LOCKING APPARATUS OF A DOOR OF A MOTOR VEHICLE

This application claims the priority of German application 10 2004 024 265.8, filed May 15, 2004, the disclosure of which is expressly incorporated by reference herein.

BACKGROUND AND SUMMARY OF THE INVENTION

The present invention concerns a safety system for operating at least one electrically actuated locking apparatus of a door of a motor vehicle including a crash sensor, adapted to sense an accident event, and a pre-crash sensor, adapted to recognize a possible imminent accident event. According to the invention, when the crash sensor senses an accident event within a first specified interval of time, the locking apparatus remains bolted for a second specified interval of time, which is sufficiently long to include an entire temporal sequence of the accident event. The apparatus is subsequently unbolted.

A device for protecting occupants of a motor vehicle in the event of a rear-end collision with a measuring device is known from German document DE 35 07 381 A1. This known device measures the distance to an object penetrating into the range lying before the motor vehicle. An evaluation switch activates a protective apparatus in the event of an undershot of a specified distance, so that protective action is completely deployed at the time of a subsequent crash. Such protective action can, for example, consist of securing the motor vehicle doors against flying open.

An automatic safety system for motor vehicles that is controlled by a driver-side reflex is described in German document DE 27 51 821 A1. At a certain degree of actuation of the brake, the doors are automatically bolted, among other things, so that, in the event of a crash (collision), the occupants are not thrown out of the motor vehicle.

Moreover, a method for steering a reversible occupant protection apparatus in a motor vehicle, with a sensor unit recording driving state data, is known from German document DE 101 21 386 C1. Emergency braking, oversteering, or understeering are monitored as driving state data. The occupant protection device is triggered as a function of such data.

A retention belt system for a seat in a motor vehicle with a seat belt and a belt tightener to secure a passenger on the seat is furthermore described in German document DE 44 11 184 C2. The distance to an object and the corresponding relative speed is ascertained, and the expected time until a possible collision between the motor vehicle and the object can be determined on the basis of these parameters. A control unit generates a control signal which increases the power of the belt tightener in time before the possible collision. If a collision can be avoided, the force of the belt tightener is lowered again.

One object of this invention is to provide a safety system for operating at least one electrically actuated door locking apparatus of a motor vehicle with a crash sensor for sensing an accident event, which makes optimized protection in relation to safety systems known from the state of the art available to occupants during a critical driving operation before an unwanted opening actuation.

This object is accomplished by way of a safety system as mentioned above in which the pre-crash sensor, upon recognition of a possible imminent accident event, actuates a central locking unit in such a way that the locking apparatus of the door is bolted for the first specified interval of time, and in which the first specified interval of time has a length such that the possible accident event, if it occurs, falls in the first specified interval of time.

A pre-crash sensor, provided in accordance with the invention, actuates the central bolting unit upon recognition of a possible imminent accident event in such a way that the locking apparatus of the door is bolted for the first specified interval of time. Again, this first specified interval of time has such a length that the occurrence of the possible accident occurrence falls in the first specified time interval. The safety system for operating the electrically actuated locking apparatus of the door of the motor vehicle has a crash sensor for sensing an accident event. When the crash sensor senses the accident event within the first specified time interval, the locking apparatus remains bolted for a second specified interval of time, which has such a length that it includes the entire temporal sequence of the accident event, and is subsequently unbolted. With the safety system of the invention, optimal protection against unintended opening during a critical driving operation is furnished, owing to which occupant safety is improved. The locking apparatus of the door is already barred by the central bolting against an unintended opening of the door when a possibly imminent accident event is recognized by means of the pre-crash sensor. The door is thus secured against opening when an actual accident event occurs, which is sensed using the crash sensor, and remains closed during the entire accident event sequence. After the accident event lapses, the locking apparatus of the door is unbolted again to enable the occupants to leave the motor vehicle. If no accident event occurs in the first specified interval of time, the locking apparatus of the door is likewise unbolted. The occupants are thus reliably prevented from being hurled out of the motor vehicle during the sequence of the actual accident event. Likewise, no objects endangering the occupants of the motor vehicle can penetrate into the motor vehicle during the accident event.

It is advantageous if the first specified interval of time can be adjusted as a function of the traffic-relevant data recorded by the pre-crash sensor. Through a suitable choice of the length of the first specified interval of time, it can be assured that the occurrence of the accident event, if it actually takes place, occurs in the first specified interval of time. The first specified interval of time can thus be adapted to various possible accident scenarios.

In one refinement of the invention, the second specified interval of time is adjustable as a function of the sensor values of the crash sensor recorded. Through a suitable choice of the length of the second specified interval of time, it can be assured that the locking apparatus of the door remains blocked, during the entire accident event sequence, against an unwanted opening. The length of the second specified interval of time can be correspondingly adapted as a function of the type of accident event.

The safety-relevant data for a driving operation for the pre-crash sensor can be driving state magnitudes. Magnitudes such as motor vehicle speed, yawing, longitudinal and transverse acceleration, brake pedal and accelerator position, and steering angle are used as driving state magnitudes. Furthermore, the status of operating elements such as turn signals and hazard warning lights, as well as the status of sensors and control devices affecting the status of the motor vehicle, can be used as driving state magnitudes.

Environmental data can alternatively or additionally be safety-relevant data for driving operation. Data furnished by environmental sensors, by telematic systems, and by communication of the motor vehicle with other motor vehicles and stationary communication systems can be designated as environmental data. Examples of environmental data are information on the current place, the road category, and the driving lane upon which the particular vehicle is driving. Further environmental data are, among other things, road condition, temperature, weather conditions, and lighting conditions, as well as speed, distance, type and size of motor vehicles driving ahead, alongside, behind, or oncoming, and data provided by other traffic participants.

It is advantageous if the driver activities are evaluated for safety-relevant data for driving operation. Driver activities recorded include, for example, a recognition of eye motion and the direction of view, and also processes of operating elements such as, for example, a steering wheel, a gearshift, and a brake pedal. Through the evaluation of a large number of safety-relevant data, occupant protection safety can be additionally increased.

Further advantageous refinements of the invention are set forth in the dependent claims.

BRIEF DESCRIPTION OF THE DRAWING FIGURE

The invention will be explained in greater detail on the basis of an embodiment shown in the sole drawing FIGURE, which is a block representation of a safety system for operating an electrically actuated locking apparatus of a motor vehicle.

DETAILED DESCRIPTION OF THE INVENTION

A safety system 1 for operating an electrically actuated locking apparatus 2 of a door 3 of a motor vehicle not represented in greater detail has a pre-crash sensor 4, which upon recognizing a possible imminent accident event controls a central locking unit 5 in such a way that the locking apparatus 2 of the door 3 is bolted for a first specified interval of time, which has such a length that the occurrence of the possible accident event falls in the first specified interval of time. The locking apparatus 2 cannot be opened mechanically from the outside, for example by the action of a foreign body.

The locking apparatus 2 remains bolted upon sensing the actual accident event by a crash sensor 6 within the first specified interval of time for a second specified interval of time, which has such a length that it encompasses the entire temporal sequence of the accident event. The locking apparatus 2 can also not be opened mechanically from without during the second specified interval of time. Upon expiration of the second specified interval of time, the locking apparatus 2 of the door 3 is unbolted again. If no accident event is sensed during the first specified interval of time using the crash sensor 6, then the locking apparatus 2 of the door 3 is unbolted following lapse of the first specified interval of time.

Several locking apparatuses 2 can also be actuated with the safety system 1. The door 3 of the motor vehicle can in particular be a back hatch or a back door of the motor vehicle.

The safety system 1 can be operated, in an embodiment not represented in greater detail, in such a way that in each case only that locking apparatus 2 of a door 3 is actuated that is subordinated to a motor vehicle seat which is occupied by an occupant. In a further refinement, only those locking apparatuses 2 of doors 3 can also be actuated which are allocated to a row of seats in which an occupant is situated.

In this way, the advantage is attained that doors 3, which are not reachable for an occupant, are first of all not blocked at all by the respective associated locking apparatuses 2.

It is advantageous if the first specified interval of time can be adjusted as a function of the traffic-relevant data 7 recorded by the pre-crash sensor 4, and the second specified interval of time, as a function of the sensor values 8 recorded by the crash sensor 6.

The pre-crash sensor 4 uses driving state magnitudes, environment data and/or evaluated driver activities as traffic-relevant data 7.

The safety system 1 of the invention for operating the electrically actuated locking apparatus 2 of the door 3 of the motor vehicle guarantees timely bolting of the locking apparatus 2 already before the occurrence of the accident. Above and beyond this, it is guaranteed that the locking apparatus 2 remains bolted during the entire sequence of the accident sequence. The safety system 1 can be realized with but a small expense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A safety system for operating at least one electrically actuated locking apparatus of a door of a motor vehicle comprising:
    a crash sensor adapted to sense an accident event, and
    a pre-crash sensor adapted to recognize a possible imminent accident event,
    wherein the pre-crash sensor, upon recognition of a possible imminent accident event, actuates a central locking unit in such a way that the locking apparatus of the door is bolted for a first specified interval of time,
    wherein, when the crash sensor senses the accident event within the first specified interval of time, the locking apparatus remains bolted for a second specified interval of time, which has such a length that it includes an entire temporal sequence of the accident event, and is subsequently unbolted, and
    wherein the first specified interval of time has a length such that the occurrence of the possible accident event falls in the first specified interval of time.

2. The safety system according to claim 1, wherein the first specified interval of time can be adjusted as a function of traffic-relevant data recorded by the pre-crash sensor.

3. The safety system according to claim 1, wherein the second specified interval of time can be adjusted as a function of sensor values recorded by the crash sensor.

4. The safety system according to claim 1, wherein, when the crash sensor does not sense any accident event, the locking apparatus is unbolted upon expiration of the first specified interval of time.

5. The safety system according to claim 1, wherein the locking apparatus cannot be opened mechanically from the outside during the first specified interval of time.

6. The safety system according to claim 1, wherein the locking apparatus cannot be opened mechanically from the outside during the second specified interval of time.

7. The safety system according to claim 1, wherein the door of the motor vehicle is a back hatch or back door of the motor vehicle.

8. The safety system according to claim 2, wherein the pre-crash sensor uses at least one of driving state magnitudes, environment data, and evaluated driver activities as the traffic-relevant data.

9. A safety system for operating at least one electrically actuated locking apparatus of a door of a motor vehicle, in which evaluation based on at least one of a driving state and input from an environment sensor unit, which allows inference of an imminent accident event, leads to a bolting of the locking apparatus, wherein the locking apparatus cannot be opened mechanically from outside of the motor vehicle for a first specified interval of time after bolting thereof, and wherein the locking apparatus remains bolted for a second specified interval of time when an actual accident event is sensed.

10. The safety system according to claim 9, wherein the second specified interval of time entirely encompasses the duration of the actual accident event.

11. The safety system according to claim 10, wherein the locking apparatus is unbolted upon expiration of the second specified interval of time.

* * * * *